Feb. 9, 1943.  A. H. FESSLER ET AL  2,310,578
METHOD OF FIRING CERAMIC WARE
Filed Aug. 2, 1940   5 Sheets-Sheet 1
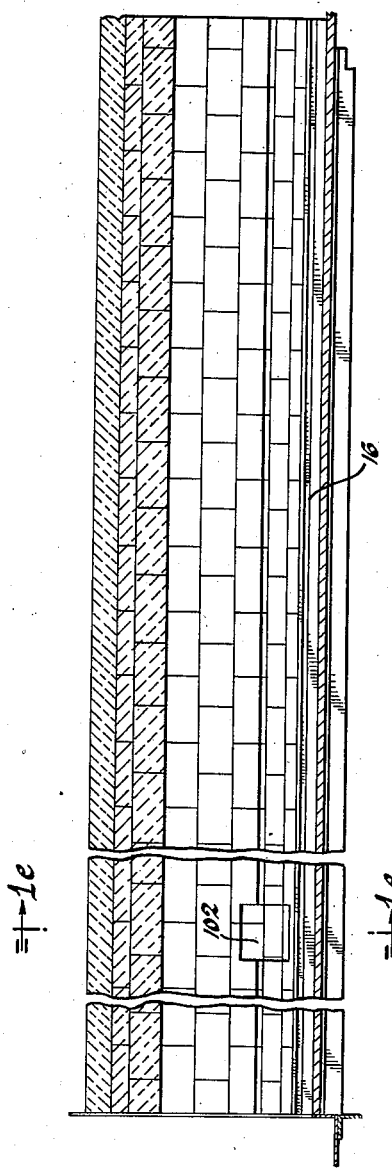
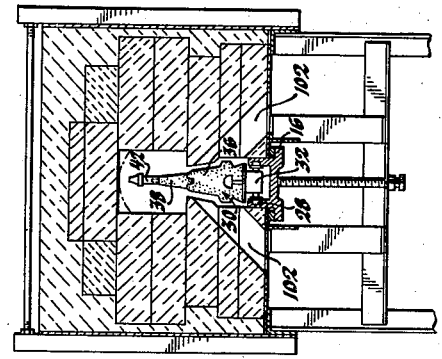
Inventors
Albra H. Fessler &
Arthur P. Watts
By
Blackmore, Spencer & Flint
Attorneys Feb. 9, 1943.    A. H. FESSLER ET AL    2,310,578
METHOD OF FIRING CERAMIC WARE
Filed Aug. 2, 1940    5 Sheets-Sheet 2
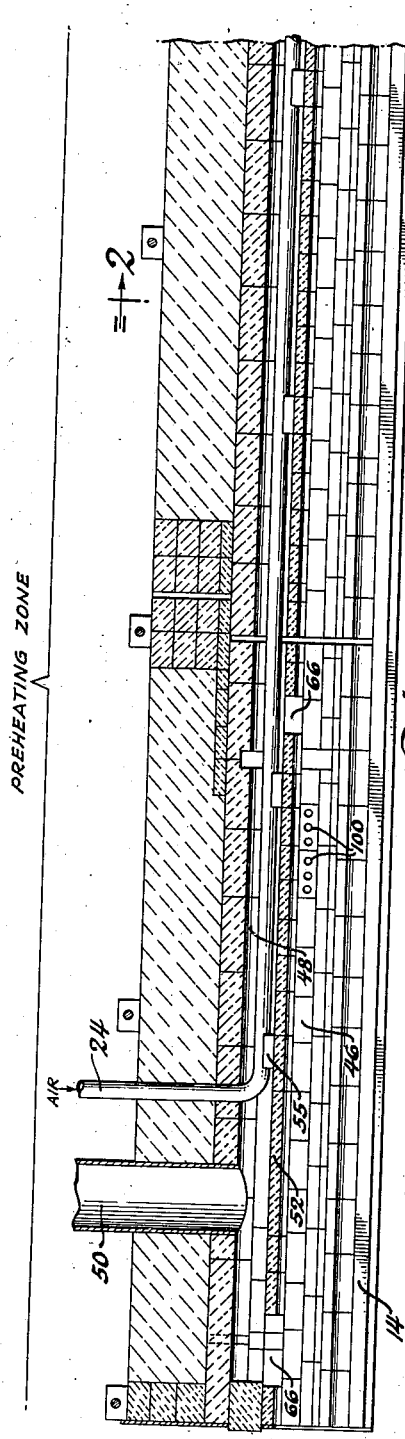
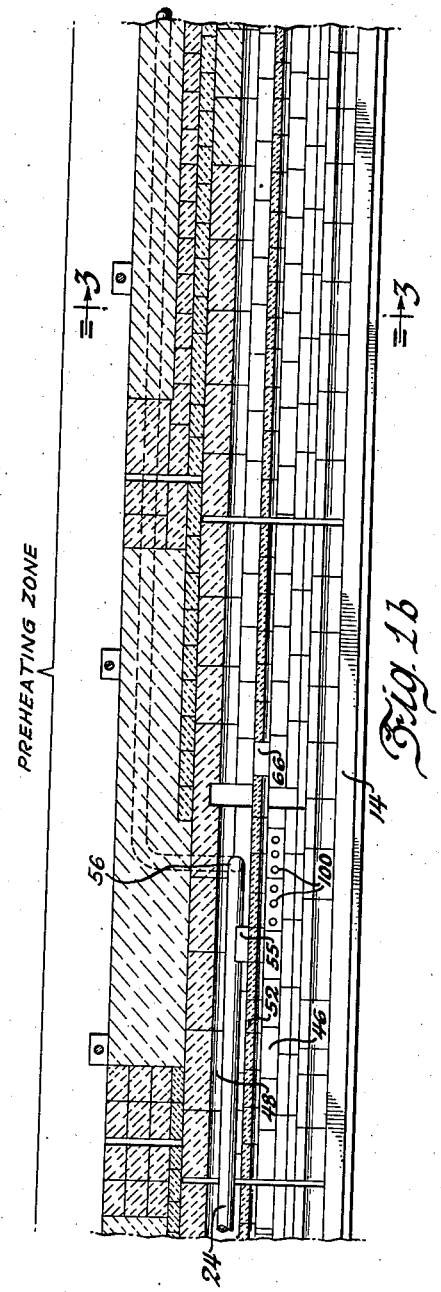

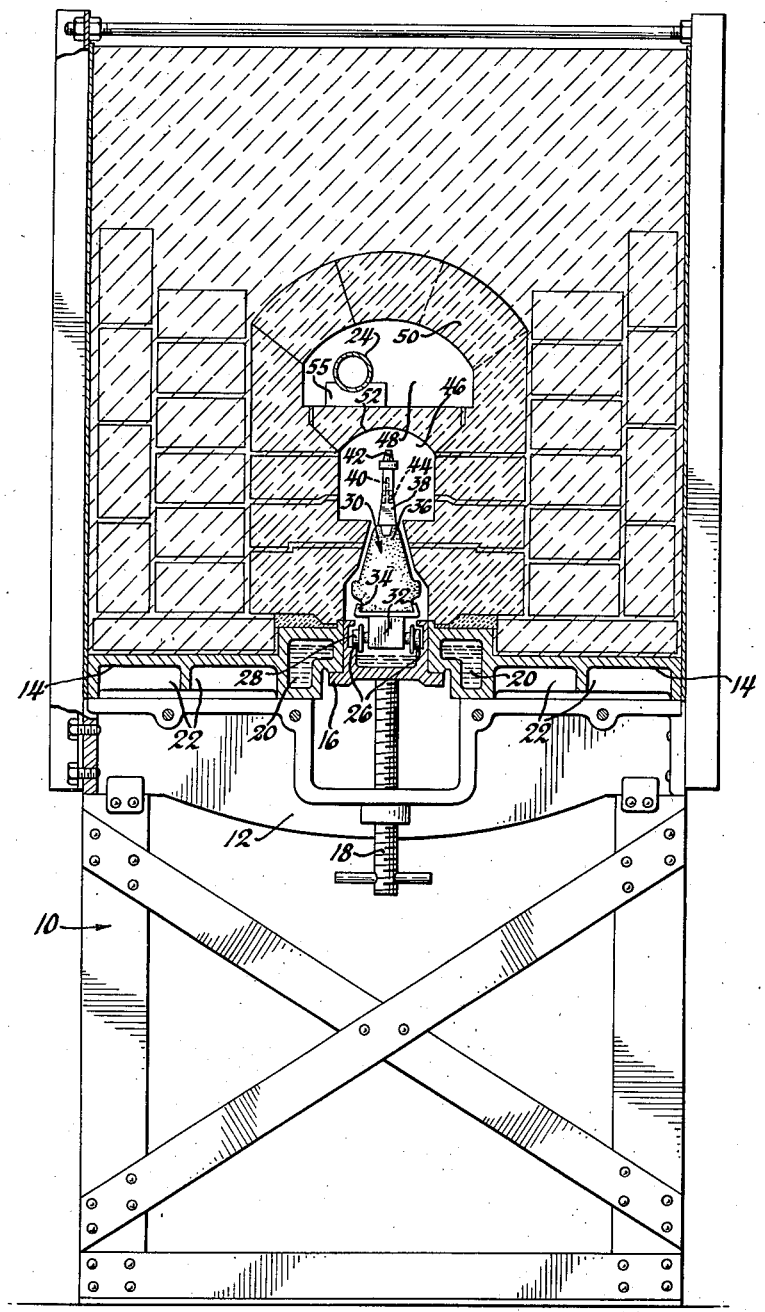

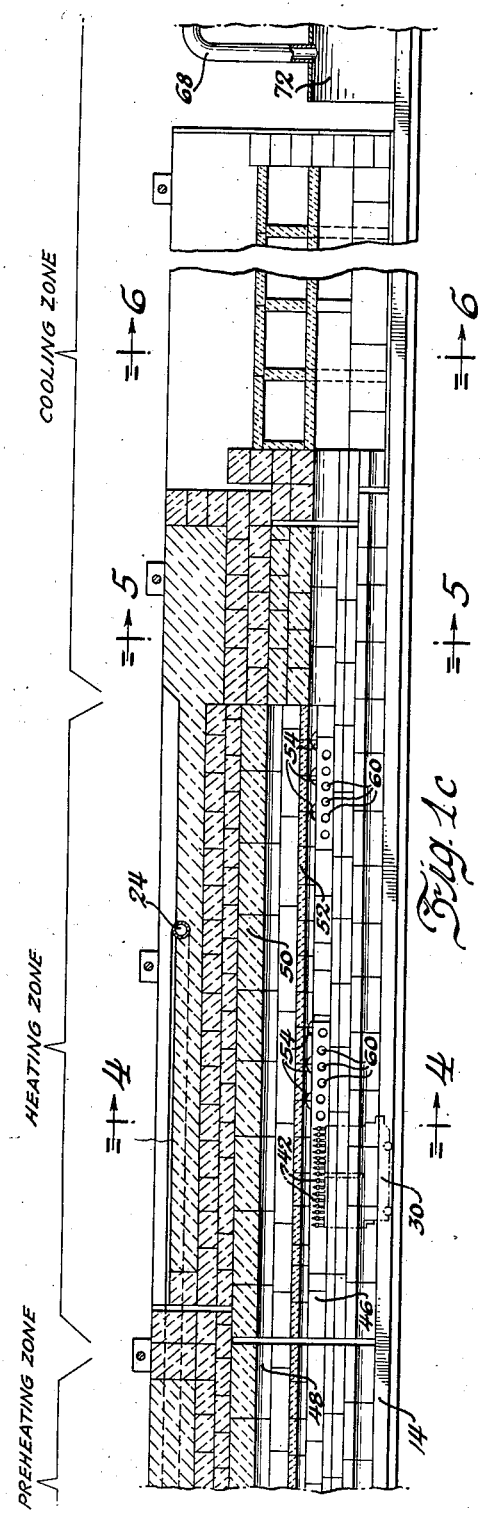

Patented Feb. 9, 1943

2,310,578

UNITED STATES PATENT OFFICE 2,310,578

METHOD OF FIRING CERAMIC WARE

Albra H. Fessler and Arthur P. Watts, Flint, Mich., assignors to General Motors Corporation, Detroit, Mich., a corporation of Delaware Application August 2, 1940, Serial No. 350,016

3 Claims. (Cl. 25—156)

In the manufacture of ceramic articles such as spark plug insulators by the process described and claimed in Patent No. 2,122,950 granted July 5, 1938, to Karl Schwartzwalder it is important that the binder used to hold the ceramic material in the desired shape prior to sintering be completely removed from the ware, for the presence of the binder in the finished product may seriously lower the strength and other physical properties of the body as well as give it an undesirable appearance. It is also important that the binder be driven off gradually and preferably at a definite rate so that the body may not be cracked or otherwise disrupted by sudden distillation, sublimation or oxidation of the binder.

A common method of firing bodies formed by the Schwartzwalder process consists in passing them through a tunnel kiln consisting of a preheating zone, a firing zone and a cooling zone. In the firing zone the ware is preferably subjected to the direct action of suitable burners which project their products of combustion on or in close proximity to the ware. The kiln is so designed that the products of combustion escape into the preheating zone, travel toward the ware entrance end of the kiln and then find outlet through a suitable stack.

It was naturally assumed that as the ware traveled through the preheating zone it was subjected to increasing temperatures reaching the maximum in the firing zone and that since the binder was progressively driven off and oxidized during the passage through the preheating zone, the oxygen content of the kiln atmosphere in the preheating zone gradually decreased as the kiln entrance was approached. These conditions, it was assumed, insured gradual elimination of the binder and a maximum of perfectly fired ware.

In an effort to further improve the process and increase the percentage of perfect ware a careful study was made of kiln temperatures and atmospheric conditions and it was discovered that contrary to supposition the oxygen content increased substantially from the firing zone toward the entrance of the kiln. For example, with an oxygen content of as little as 3% in the firing zone an oxygen content of as high as 15% was found to exist adjacent the kiln entrance. It was found that this increased oxygen content, together with a somewhat too rapid rate of reduction in temperature of combustion gases as the kiln entrance was approached caused the binder to be eliminated too rapidly with resulting increase in imperfectly fired ware. Attempts to correct the difficulty by shortening the length of time of the firing cycle proved unsuccessful for the binder was often completely burned out, leaving the ware imperfect.

We have found it possible to obtain a considerably increased percentage of perfect ware by carefully controlling the oxygen content as well as the temperature in the preheating zone so as to insure the proper elimination of the binder. Obviously the oxygen content may be controlled in a number of ways as, for example, by injecting into the kiln suitable proportions of inert or non-oxidizing gases so as to reduce by dilution the oxygen content to the amount desired. The temperature gradient may be made more gradual by suitably designing the kiln or by the application of heat externally. However, we have found that excellent results may be obtained simply by introducing suitable auxiliary burners in the preheating zone. The fuel-air ratio fed to these burners is adjusted to reduce the oxygen content and at the same time provide a sharper increase in temperature as the ware enters and travels through the preheating zone. By this simple improvement it has been found possible to substantially increase the percentage of perfectly fired ware and at the same time permit rapid passage of the ware through the kiln. The whole firing process may be completed in as little as four hours.

In the drawings:

Figures 1, 1a, 1b and 1c constitute together a longitudinal section through an improved kiln embodying the invention.

Figure 1d is a continuation of Figure 1c showing the cooling zone in side elevation.

Figure 1e is an end view of the portion of the kiln shown in Figure 1. In this figure the construction of one-half only of the kiln is shown, the other half being of identical but complementary construction.

Figure 2 is a section on line 2—2 of Figure 1a showing in addition the support for the kiln.

Figure 3:
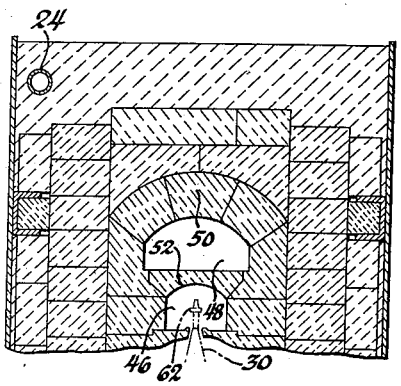
Figure 3 is a section on line 3—3 of Figure 1b.

The kiln shown in Figures 1 to 8, inclusive, is of the so-called miniature type described and claimed in prior Patents Nos. 1,713,851 and 2,137,091. This type of kiln is designed to fire ware passed through it preferably in single file. It possesses the advantage of requiring but a short time for the passage of ware through the kiln, and its capacity is substantially large even when compared with the much larger cross-sectional kilns which necessitate on the order of 36 to 72 hours for firing the ware.

The kiln consists of the preheating zone which comprises all of Figures 1, 1a and 1b and the portion marked "Preheating zone" in Figure 1c; the heating zone shown at the center of Figure 1c, and the cooling zone shown at the right of Figure 1c and in Figure 1d.

The kiln is of comparatively small size, being designed especially for the firing of spark plug insulators, and for convenience in operation and repair it has been found desirable to mount it on a stand extending the full length thereof. The stand is indicated at 10 in Figure 2, and consists of suitably braced supporting members spaced along the length of the kiln. Each of the supporting members carries at its top a member 12 adapted to carry the opposed base plates 14 spaced apart to receive the track 16. The track 16 may be raised or lowered by adjusting the supporting screws 18 threaded in the members 12. The base plates 14 extend the full length of the kiln, and are preferably of channeled construction as shown. The inner channels 20 are fed preferably with cooling water at one end, while at the other end the water is permitted to flow out. The circulating water assists in cooling the track. The outer channels 22 may act as air ducts receiving air at the discharge end of the kiln, and feeding it to a suitable pump located at the entrance end of the kiln, the pump supplying the air to pipe 24 which conducts combustion air to the burners.

It will be noted that the track 16 is of U-shape, and it is provided with a fall on the order of one inch in its entire length so that water may be fed in at one end, and discharged from the other to assist in cooling the track and the cars.

The sides of the track member 16 are grooved as shown at 26 to receive the flanged wheels 28 of the cars 30. The wheels 26 are mounted on axles journaled in car frame 32. The frames, axles and wheels are preferably made of heat resisting metal, such as nickel chromium alloy. The car frames 32 are provided with flanged portions 34 adapted to receive refractory bricks 36 which, in turn, support refractories 38 carrying pins 40 on which the insulators 42 are mounted. To facilitate the insertion and removal of the pins 40 the refractories 38 are preferably provided with transverse openings 44 as shown.

Figure 4:
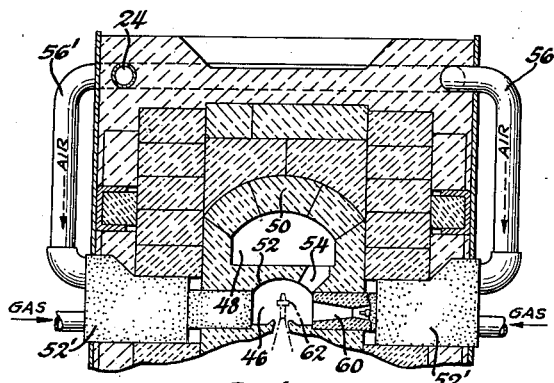
Figures 4, 5 and 6 are sections on corresponding section lines of Figure 1c.

The heating zone of the kiln is shown in Figures 1c and 4. Here the kiln is formed to provide two tunnels 46 and 48, one above the other. The walls of the tunnels are lined with high temperature refractory blocks, and the upper wall 50 of the tunnel 48 is in the form of an arch which supports the weight of the refractories above it. The upper wall 52 of the tunnel 46 carries its own weight only, and is provided with spaced flues 54 connecting the tunnels.

Only a portion of the flue gases go into the upper tunnel 48 and the balance go through the lower tunnel 46 to the entrance of the kiln where they are discharged into a suitable stack not shown through passages 102 and connecting ducts not shown. The discharge of flue gases between the upper tunnel 48 and the lower tunnel 46 may be varied by regulating dampers in the stacks. If preferred all the flue gases may be discharged through lower tunnel 46 and passages 102.

The tunnel 48 acts as a flue extending from the heating zone throughout the major portion of the preheating zone to the stack 50.

The pipe 24 conducting air to the burners 52 extends throughout the major portion of the length of the tunnel 48 in the preheating zone so that the air is heated by the flue gases. The pipe 24 is preferably supported on spaced blocks 55 made of suitable refractory material. The pipe 24 leaves the preheating zone at some suitable point, such as indicated at 56 in Figure 1b, and then extends along the top of the kiln, preferably embedded in the loose refractory material there provided, and conducts air to suitable manifolds 56' where it is distributed to the burners 52' as shown in Figure 4.

The burners 52' may be of any suitable type and are preferably fed with gaseous fuel. Suitable vanes may be provided to give a whirling motion to the entering fuel or air so as to insure thorough mixture. The combustible mixture is projected under pressure through a suitable orifice 60, preferably provided with a restriction or venturi, directly onto the ware 42 so that a very high temperature is maintained at the surface of the ware. No doubt "surface combustion" takes place on the ware's surface. A portion of the combustion gases passes through the flues 54 into the upper tunnel 48.

With this construction of kiln it has been found possible to obtain temperatures as much as 60° to 150° C. higher at the surface of the ware than at the walls of the tunnel so that the refractories are subjected to less burden, while at the same time the necessary higher temperatures are attained at the ware. At high firing temperatures, for example, around 1750° C., the problem of providing suitable refractories for the walls of the kiln is a difficult one, and by this method of firing the refractory problem is capable of practical solution at reasonable cost.

The burners 52 are preferably arranged in staggered groups as shown in Figures 1c and 4, a group on one side of the kiln being followed by a group on the opposite wall of the kiln so as to apply the intense heat to both sides of the insulator.

Tunnel 46 extends throughout the full length of the kiln while tunnel 48 extends throughout the heating zone and the preheating zone except for the portion shown in Fig. 1. Flues 66 connect the tunnels at spaced points. The flue 66 nearest the entrance is of considerable size so as to afford the burnt gases passing through the tunnel 46 ready access to the stack 50. A portion of the combustion gases passes out through the section of the preheating zone shown in Fig. 1, heating the incoming ware and discharging through passages 102 as previously described.

Figure 5:
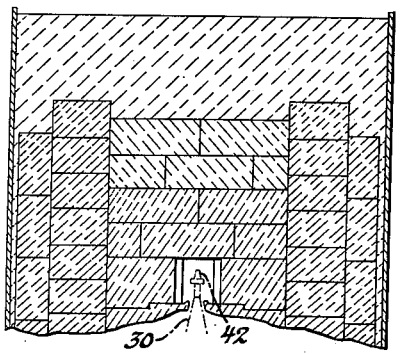
Figure 6:
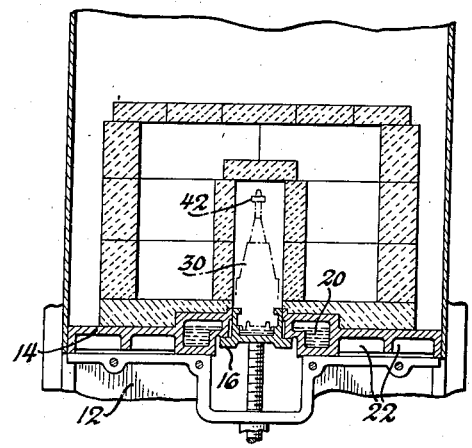
Figure 7:
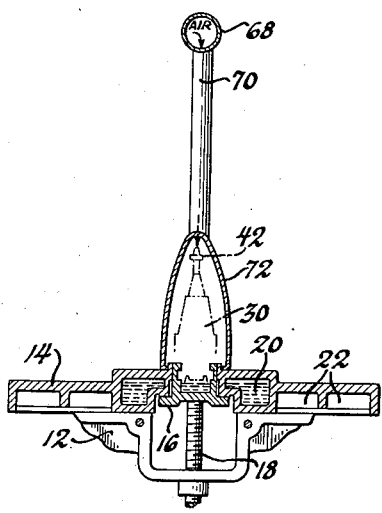
Figure 7 is a section on line 7—7 of Figure 1d.
Figure 8:
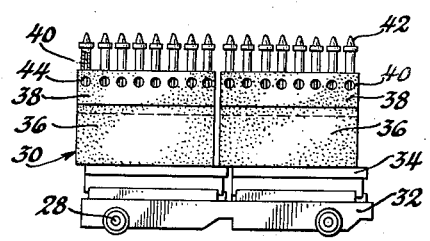
Figure 8 is a side elevation of one of the ware carrying cars.

The cooling zone is divided into, first, an indirect cooling zone made of solid masonry as shown in Figure 5; next, an air-jacketed masonry cooling zone as shown in Figure 6; and, preferably spaced from the end of the latter, a direct air cooling zone shown at the extreme right of Figure 1c and in Figure 1d. In the last named zone air is supplied through the conduit 68 to pipes 70 inclined toward the entering ware, and the pipes 70 direct the air through the sheet metal tunnel portions 72, preferably spaced from each other and from the end of the kiln proper as shown. The air under pressure travels through the tunnel 72 in a direction opposite to the direction of feed of the ware so as to offset the tendency of the combustion gases to pass outwardly through the cooling zone. At the same time the pressure should not be sufficient to force air toward the heating zone as this would tend to reduce uneconomically the temperature in the hot zone.

The kiln as so far described is substantially the same as that disclosed in said prior Patent No. 2,137,091 except for the addition of the portion of the preheating zone shown in Figures 1 and 1e.

An important feature of our invention consists in the provision of burners such as indicated at 100 in the preheating zone, as shown in Figures 1a and 1b. As in the case of the burners in the heating zone, these are preferably arranged in opposed, slightly staggered groups so that the combustion gases can play upon both sides of the ware. The burners may be fed with fuel and air from any suitable source. These burners are of importance in assuring the proper atmosphere and temperature control in the preheating zone so that the temporary binder used to hold the insulators in shape may be gradually eliminated without disrupting them, as hereinafter pointed out.

In the operation of the kiln, loaded cars are introduced at the left of Figure 1, and are continuously fed through the preheating zone where the temperature is gradually raised by the heat from the burners 100 as well as by the direct action of flue gases traveling toward the stack through tunnel 46 and by the heat radiated from the wall 52 which is heated by the said burners and by the flue gases traveling through both tunnels 46 and 48. The flue gases traveling through tunnel 48 raise the temperature of the combustion air in pipes 24 to quite a high degree, preferably on the order of 400° C., and this air is delivered under pressure to the burners where it mixes with the fuel, preferably ordinary commercial gas, or butane. If desired the flue gases may be confined to lower tunnel 46 which will reduce the temperature of the combustion air passing through pipe 24 in tunnel 48. To insure adequate preheating of the ware, as well as of the combustion air it may be desirable to provide baffles here and there in tunnels 46 and/or 48 to control the velocity of the flue gases.

The thoroughly heated bodies then pass into the heating zone where they are subject to direct impingement of the flame from the burners, thus providing the maximum temperature of combustion at the surface of the ware.

This heating is preferably effected alternately, first on one side and then on the other, but, if desired, burners could be arranged in opposed relation to heat the two sides simultaneously. Actual installation temperatures as high as 1750° C. have been obtained at the surface of the ware, while the temperatures at the walls of the kiln were on the order of 150° lower.

The fired wares then pass into the cooling zone where they are successively cooled by the surrounding refractories of the indirect cooling zone, then by the cooling of the air-jacketed zone, and finally by the direct air blast in the tunnel portion 72. In some cases it may be desirable to use a water cooling zone between the air-jacketed portion of the tunnel and the direct air cooling zone, but in practice this has not been found necessary.

While the ware has thus been subjected to gradual heating, intense heating and gradual cooling, the cars, and particularly the lubricated parts, such as the journals for the wheels, have been maintained at a temperature to insure good lubrication by the cooling system consisting of water flowing through the track 16 and through the abutting water-jacketed portions of the base plates 14.

In kilns as usually designed no burners are provided in the preheating zone. The outgoing gases from the hot zone burners are relied upon to provide the desired temperature gradient for gradually bringing the ware up to firing temperature. We have provided burners 100 in the preheating zone to reduce the oxygen content in this portion of the kiln so as to insure the proper elimination of the binder. By so reducing the oxygen content distillation is apparently completed before oxidation of residual carbon proceeds. The burners may be so arranged as to reduce the increase in oxygen content which otherwise results as the hot-zone combustion gases approach the kiln entrance; or to maintain the oxygen content substantially at the percentage existing in the firing zone; or to reduce the oxygen content as the kiln entrance is approached. Choice of conditions is determined largely by the requirements of the ware being fired and the percentage of binder used in it. The burners 100 also produce a more gradual increase in temperature as the ware enters thru the preheating zone.

The following is an example of a combination of oxygen content and temperature gradient which has proven particularly successful in firing ware composed of a ceramic mixture consisting of aluminum oxide together with proportions of zircon and talc, with a binder consisting of resin and a suitable lubricant, the binder amounting to approximately 12% of the mixture by weight.

In the first few feet of travel through the kiln—approximately four or five feet, the temperature rather rapidly increases to around 700° C. Thereafter the temperature increases gradually until a maximum of about 1100° is attained at the first set of burners in the preheating zone. The effect of these burners is to insure an oxygen content of not more than 3.5 to 4% throughout the major part of this portion of the preheating zone up to and including the first set of burners. Upon leaving the first set of preheating burners the temperature of the kiln drops off rather rapidly from around 1400° C. to 900 to 1000° C. and as the second set of pre-heating burners is approached the temperature rises rapidly to about 1400° C. In this portion of the preheating zone the oxygen content is preferably maintained between 2.5 and 3%. Upon leaving the second set of pre-heating zone burners, the temperature falls off somewhat but upon approaching the burners in the heating zone rises rapidly to about 1700° C. In this travel the oxygen content drops off to a minimum of about .7% as the heating zone is approached reaching a maximum of about 4% at the burners. Under the described conditions ware has been successfully fired on a four hour cycle with no loss due to imperfect oxidation.

It will be understood that the above is given by way of example and not limitation as considerable variation may be made in both oxygen and temperature control without adversely affecting the ware.

In general good results have been obtained with oxygen contents varying from 2 to 6% in the preheating zone with preferably a maximum oxygen content on the order of 4% in the portion of the preheating zone adjacent the heating zone. Similarly the temperatures at various portions throughout the preheating zone may be varied considerably, i. e., on the order of from 10 to 40%, without injury to the ware. The precise oxidation and temperature control will, of course, vary somewhat with the composition of the ware.

Various modifications of the invention will occur to those skilled in the art. Thus the atmosphere may be controlled by dilution of the combustion gases by means of certain inert or non-oxidizing gases such as nitrogen or carbon dioxide instead of using burners in the preheating zone. The invention may be applied to tunnel kilns in which the ware pass through the kiln a number abreast instead of single file.

We claim:

1. The method of firing ceramic ware held together by a temporary oxidizable binder adapted to be driven off prior to the sintering or vitrefying of the ware comprising passing the ware successively through a preheating chamber, a firing chamber and a cooling chamber, subjecting the ware to the direct action of hot combustion gases in the firing zone, causing the products of combustion to pass outwardly from the firing zone through the preheating zone to initially heat the ware and drive off the binder, said products of combustion constituting substantially the entire atmosphere in the preheating zone and further reducing the uncombined oxygen content in the preheating zone to prevent disruption of the ware by too sudden elimination of the binder.

2. The method of firing ceramic ware held together by a temporary oxidizable binder adapted to be driven off prior to the sintering or vitrefying of the ware comprising passing the ware successively through a preheating zone, a firing zone and a cooling zone, subjecting the ware to the direct action of hot combustion gases in the firing zone, causing the products of combustion to pass outwardly from the firing zone through the preheating zone to initially heat the ware and drive off the binder, and further reducing the uncombined oxygen content in the preheating zone by introducing additional burnt combustion gases into said zone, thereby preventing disruption of the ware by too sudden elimination of the binder, said products of combustion and combustion gases constituting substantially the entire atmosphere in the preheating zone.

3. The method of firing ceramic ware held together by a temporary oxidizable binder adapted to be driven off prior to the sintering or vitrefying of the ware comprising passing the ware successively through a preheating zone, a firing zone and a cooling zone, subjecting the ware to the direct action of hot combustion gases in the firing zone, causing the products of combustion to pass outwardly from the firing zone through the preheating zone to initially heat the ware and drive off the binder, and further reducing the uncombined oxygen content in the preheating zone by burning fuel in said zone, thereby preventing disruption of the ware by too sudden elimination of the binder, said products of combustion as modified by the said burning of fuel constituting substantially the entire atmosphere in the preheating zone.

ALBRA H. FESSLER.
ARTHUR P. WATTS.